(12) United States Patent
Konno

(10) Patent No.: US 8,712,443 B2
(45) Date of Patent: Apr. 29, 2014

(54) WIRELESS COMMUNICATION METHOD, WIRELESS COMMUNICATION SYSTEM, AND MODE SWITCHING METHOD

(75) Inventor: Kazuya Konno, Sagamihara (JP)

(73) Assignee: Kyocera Corporation, Fushimi-ku, Kyoto-shi, Kyoto (JP)

( * ) Notice: Subject to any disclaimer, the term of this patent is extended or adjusted under 35 U.S.C. 154(b) by 0 days.

(21) Appl. No.: 13/065,198

(22) Filed: Mar. 16, 2011

(65) Prior Publication Data

US 2011/0171978 A1    Jul. 14, 2011

Related U.S. Application Data

(62) Division of application No. 10/376,020, filed on Feb. 27, 2003, now Pat. No. 7,929,979.

(30) Foreign Application Priority Data

Feb. 27, 2002    (JP) ................................ 2002-052273

(51) Int. Cl.
   *H04W 24/00*    (2009.01)

(52) U.S. Cl.
   USPC ..................... 455/456.4; 455/456.1; 455/440; 455/404.1; 455/411; 455/414.1

(58) Field of Classification Search
   USPC ............. 455/456.4, 456.1, 456.5, 456.6, 440, 455/404.1, 404.2, 411, 414.1, 441
   See application file for complete search history.

(56) References Cited

U.S. PATENT DOCUMENTS

| | | | |
|---|---|---|---|
| 5,774,824 A * | 6/1998 | Streit et al. ..................... 701/446 |
| 5,778,304 A | 7/1998 | Grube et al. ............... 455/456.4 |
| 5,940,764 A | 8/1999 | Mikami ..................... 455/456.6 |
| 5,991,689 A * | 11/1999 | Aito et al. ..................... 701/416 |
| 6,064,941 A * | 5/2000 | Nimura et al. ................ 701/416 |
| 6,122,486 A | 9/2000 | Tanaka et al. ................... 455/68 |

(Continued)

FOREIGN PATENT DOCUMENTS

| | | |
|---|---|---|
| CN | 1161516 A | 10/1997 |
| CN | 1171713 | 1/1998 |

(Continued)

OTHER PUBLICATIONS

Chinese First Office Action for Application No. 200610071743.3 with English Translation.

(Continued)

*Primary Examiner* — Khai M Nguyen
(74) *Attorney, Agent, or Firm* — John C. Garces; Schulte Roth & Zabel, LLP

(57) ABSTRACT

In a mobile terminal (10), a position information which is received by a position information detecting section (12) is transmitted to a base station. A determining section (34) in the base station determines whether or not the received position information indicates a non-communication area which is then stored in a memory device (35). If the position information indicates a no-communication area, a communication impossible information is transmitted to the mobile terminal (10). When the communication impossible information is received, a wireless communication section (19) in the mobile terminal (10) is notified that a network is disconnected. By putting out a network disconnection request by a communication controlling section (36), the network is disconnected. Consequently, use of the mobile terminal is prohibited in an area where a mobile terminal should preferably be restricted.

6 Claims, 10 Drawing Sheets

(56) References Cited

U.S. PATENT DOCUMENTS

| | | |
|---|---|---|
| 6,314,282 B1 | 11/2001 | Weber et al. ............... 455/404.2 |
| 6,421,544 B1 | 7/2002 | Sawada ......................... 455/565 |
| 6,438,385 B1 | 8/2002 | Heinonen et al. ............. 455/501 |
| 6,484,093 B1 | 11/2002 | Ito et al. ......................... 701/211 |
| 6,580,372 B1 | 6/2003 | Harris ........................ 340/686.6 |
| 6,597,906 B1 | 7/2003 | Van Leeuwen et al. ....... 455/436 |
| 6,625,455 B1 | 9/2003 | Ariga .......................... 455/456.1 |
| 6,671,618 B2 * | 12/2003 | Hoisko .......................... 701/466 |
| 6,823,199 B2 | 11/2004 | Gough .......................... 455/567 |
| 6,937,868 B2 | 8/2005 | Himmel et al. ............. 455/456.4 |
| 7,451,044 B2 * | 11/2008 | Park et al. ...................... 701/428 |
| 2002/0055363 A1 | 5/2002 | Tanaka .......................... 455/456 |
| 2002/0067728 A1 * | 6/2002 | Okamoto .................... 370/395.2 |
| 2002/0082002 A1 * | 6/2002 | Fujii ............................. 455/419 |
| 2002/0094805 A1 | 7/2002 | Yano et al. ..................... 455/414 |
| 2004/0017907 A1 | 1/2004 | Niizato et al. ............ 379/201.01 |
| 2005/0009536 A1 | 1/2005 | Ito et al. ...................... 455/456.1 |
| 2005/0267679 A1 * | 12/2005 | Tajima .......................... 701/209 |
| 2010/0094537 A1 * | 4/2010 | Goto et al. .................... 701/201 |

FOREIGN PATENT DOCUMENTS

| | | |
|---|---|---|
| CN | 1272758 | 11/2000 |
| JP | 03-270398 | 12/1991 |
| JP | 09-185438 | 7/1997 |
| JP | 10-234082 | 9/1998 |
| JP | 11-296276 | 10/1999 |
| JP | 2000-278758 | 10/2000 |
| JP | 2001-069546 | 3/2001 |
| JP | 2001-136564 | 5/2001 |
| JP | 2001-136579 | 5/2001 |
| JP | 2001-160985 | 6/2001 |
| JP | 2002-291036 | 10/2002 |
| KR | 2001-76024 | 8/2001 |
| KR | 2001-107159 | 12/2001 |
| KR | 2001010759 * | 12/2001 |
| WO | WO 01/63316 A1 | 8/2001 |
| WO | WO 0163316 A1 * | 8/2001 |

OTHER PUBLICATIONS

Non Final Office Action for U.S. Appl. No. 10/376,020 issued on Apr. 22, 2005.
Non Final Office Action for U.S. Appl. No. 10/376,020 issued on Sep. 29, 2005.
Non Final Office Action for U.S. Appl. No. 10/376,020 issued on Apr. 3, 2006.
Final Office Action for U.S. Appl. No. 10/376,020 issued on Nov. 7, 2006.
Advisory Action Before the Filing of an Appeal Brief for U.S. Appl. No. 10/376,020 issued on May 8, 2007.
Non Final Office Action for U.S. Appl. No. 10/376,020 issued on Sep. 13, 2007.
Non Final Office Action for U.S. Appl. No. 10/376,020 issued on Jul. 2, 2008.
Final Office Action for U.S. Appl. No. 10/376,020 issued on Jun. 4, 2009.
Restriction Requirement for U.S. Appl. No. 10/376,020 issued on Oct. 28, 2009.
Non Final Office Action for U.S. Appl. No. 10/376,020 issued on Feb. 18, 2010.
Non Final Office Action for U.S. Appl. No. 10/376,020 issued on Aug. 4, 2010.
Notice of Allowance and Fees Due for U.S. Appl. No. 10/376,020 issued on Dec. 16, 2010.
Japanese Office Action for Application No. 2002-052273 issued on Feb. 7, 2006.
Japanese Office Action for Application No. 2001-322369 issued on Mar. 7, 2006.
Chinese Office Action dated Jun. 10, 2005. (Translation attached).
Korean Office Action dated Jul. 21, 2005. (Translation attached).
Japanese Office Action dated Jan. 9, 2007 with partial English translation.
Japanese Office Action dated Feb. 19, 2007 with partial English translation.

* cited by examiner

WIRELESS COMMUNICATION METHOD, WIRELESS COMMUNICATION SYSTEM, AND MODE SWITCHING METHOD

CROSS REFERENCE TO RELATED APPLICATIONS

This application is a divisional of application Ser. No. 10/376,020, filed Feb. 27, 2003 now U.S. Pat. No. 7,929,979. Application Ser. No. 10/376,020 claims priority from Japanese Application No. 2002-052273, filed Feb. 27, 2002, the contents of which are hereby incorporated by reference herein in their entirety.

BACKGROUND OF THE INVENTION

Present invention relates to a mobile terminal such as a mobile phone device provided with a position monitoring function and more specifically to mobile terminals, base stations, base station controlling stations, wireless communication method, and wireless communication system which can restrict telephone communication in an area which is automatically predetermined as a non-communication area automatically.

The present invention also relates to mobile terminals and a mode switching method which can switch an operation mode when a user of the mobile phone is using transportation facilities such as a train and bus.

Making phone calls by a mobile phone is sometimes restricted in certain areas such as a hospital, a movie theater, and a train, etc. Whoever owns a mobile phone, hereinafter called a mobile phone user, must turn off the mobile phone or change the setting condition each time such an occasion arises.

However, people around the mobile phone user feel disturbed when the mobile phone is used in such an area where mobile phone communication is restricted because of miss-handling for the mobile phone by the mobile phone user and lack of consideration of others. Another concern is that a radio wave which is radiated from the mobile phone can affect certain medical devices. Thus, the health of persons who have certain medical devices may be affected by the use of a mobile phone.

In order to solve the above-mentioned problems, a technique is proposed in which a position information of the mobile phone is handled by base stations, and the mobile phone communication is compulsorily prohibited under condition that the position of the mobile phone indicates an area where it is not appropriate to use the mobile phone or where mobile phone communication is regulated (hereinafter called no-communication area).

More specifically, the mobile phone receives an information for present position of the mobile phone periodically so as to transmit the received position information to base stations. Then, the base station determines whether or not the present position of the mobile phone corresponds to a no-communication area according to the received position information so as to regulate or allow mobile phone communication according to the determination.

Another feature is to switch the mobile phone to a silent mode or turn off the mobile phone in a train or a bus in consideration of others who may be affected by mobile phone use. For example, interference with the operation of a medical device such as a pace-maker caused by a radio wave radiated from the mobile phone can be prevented.

Normally, a mobile phone user has to switch the operation mode to silent-mode or turn off the mobile phone each time the mobile phone user uses transportation facilities such as a train and a bus. Therefore, some mobile phone users may miss switching operation mode under busy circumstances. Some mobile phone users may hesitate changing the operation mode to a silent-mode because of negligence. Thus, there will be occasions where people in the vicinity will feel disturbed.

For example, Japanese Unexamined Patent Application, First Publication No. Hei 11-296276 discloses a technique to solve the above problems. According to the specification, it is disclosed that global coordinates are received by a Global Positioning System (GPS) so as to be converted to a system of coordinates, and a position of the mobile phone is specified so as to limit execution of function by comparing the coordinates and a geographic dictionary in the mobile phone device.

Also, Japanese Unexamined Patent Application, First Publication No. 2000-278758 discloses a technique in that sensors are disposed at an entrance and an exit for an area such as a hospital, a movie theater, and a ticket barrier gate where voluntary restriction for using a mobile phone is required. An operation mode designating signal (silent-mode signal, energy-saving-mode signal) is transmitted from a transmitter/receiver when an owner of a mobile phone passes in front of the sensor. When the mobile phone receives the operation mode designating signal, the designated operation mode is set in the mobile phone.

However, according to the above conventional method, the mobile phone receives the present position information periodically during use or in standby mode and the received present position information is immediately transmitted to the base station. Therefore, there is a problem in that the mobile phone has a significant work load. Due to this extra work load, the electricity necessary for receiving and transmitting the position information is not used efficiently.

Additionally, the base station has to determine whether the position information which is received periodically from the mobile phone indicates a no-communication area. Therefore, the base station also has a significant workload causing the operation in the base station to be inefficient.

In a technique which is disclosed in Japanese Unexamined Patent Application, First Application No. Hei 11-296276, there is a problem in that execution of function in the mobile phone is limited according to the position information. Therefore, it is difficult to limit the execution of function in the mobile phone because the scope of the designated area becomes complicated for limiting the execution of function in the mobile phone which is owned by a user who is in a transportation facility such as a train. Even though the scope for designated area is tentatively predetermined along the moving route, there is a new problem in that making a call from a mobile phone is impossible near a platform of the train station or a moving route. Furthermore, since the mobile phone stores a geographical dictionary inside, there is a possibility that the data amount becomes huge according to a moving range of the mobile phone. Thus, more memory capacity becomes necessary which decreases mobility of the mobile phone.

Also, in a technique which is disclosed in Japanese Unexamined Patent Application, First Application No. 2000-278758, there is a problem in that sensors must be disposed in all entrances/exits in areas where the use of the mobile phone needs to be restricted. Thus, more investment cost for such facilities becomes necessary.

SUMMARY OF THE INVENTION

The present invention was conceived to solve the problems of the prior art described above and its object is to prohibit a mobile phone communication in an area which is predetermined as a no-communication area and to provide a mobile terminal, a base station, a base station controlling station, wireless communication method, and wireless communication system which can reduce workload in the mobile terminal and the base station which performs such processes.

Furthermore, another object of the present invention is to provide a mobile terminal and a mode switching method which can usefully prevent mischievous radio wave emissions by automatically changing the operation mode necessary in the transportation facilities such as a train and a bus.

In order to achieve the above objects, the present invention provides a mobile terminal comprising a position information receiving section for receiving present position information, a transmitting section for transmitting position information to a base station when a network connection request is sent, or when a phone call is received, or in a predetermined period when performing a communication, a network disconnecting section for disconnecting a network with the base station when information memorized in advance is received and indicates a non-communication area.

The above transmitting section transmits a transmission request and a position information to the base station when performing a network connection request. Also, the above transmitting section transmits a wireless condition report and the position information to the base station when the mobile phone receives a phone call. The transmitting section transmits a communication information and the position information during communication. "Disconnecting the network" includes a case in which a network is released (disconnected) by the base station during a call set-up, and the terminal is processed to be set in a standby condition from the transmitting condition.

More specifically, the mobile terminal disconnects the connecting (communicating) network (releases the communication channel) when the network is released by the base station during the network connection (during communication). By doing this, the screen in the communicating mobile terminal is switched from a communicating screen to a standby screen.

Also, the mobile terminal stops processing for a call set-up when the network is released by the base station during the set-up call process by the transmission. By doing this, the screen in the mobile terminal is switched from a transmitting screen (displaying a telephone number/name to talk with) to a standby screen. The screen in the mobile terminal is switched from a call receiving screen to a standby screen when the network is released by the base station and a phone call is being received. Here, there is a case in which the network is disconnected before performing a phone receiving report when a phone call arrives. In such a case, there is no notification to a mobile terminal user that a phone call is arriving.

A mobile terminal may comprise a notifying section for notifying a mobile terminal user before disconnecting the network by the network disconnecting section that the network is disconnected.

Also, a base station may comprise a memorizing section for memorizing a position information in a service area which is in a coverage area of the base station, a determining section for determining whether or not a present position information of a mobile terminal which is received from the mobile terminal indicates a non-communication area, and a network disconnecting section for disconnecting a network with the mobile terminal when the position information indicates a non-communication area.

Also, in a base station, disconnection of the network may be notified to the mobile terminal or other mobile terminals which are communicating with the mobile terminal when the communication is disconnected by the network disconnecting section.

A base station controlling station may comprise a memorizing section for memorizing a position information of a non-communication area, a determining section for determining whether or not a present position information of a mobile terminal which is received from the mobile terminal via a base station indicates a non-communication area, and a communication controlling section for instructing the base station to disconnect a network with the mobile terminal when the position information indicates a non-communication area.

Also, wireless communication method may comprise steps of determining whether or not a present position information of a mobile terminal which is received from the mobile terminal indicates a non-communication area which is memorized in advance, and disconnecting a network with the mobile terminal when the position information indicates the non-communication area.

Moreover, in a wireless communication system having mobile terminals and base stations so as to perform wireless communication, the mobile terminal may comprise a position information receiving section for receiving a position information and a transmitting section for transmitting the position information to the base station, and the base station may comprise a determining section for determining whether or not a position information of a mobile terminal which is received from the mobile terminal indicates a non-communication area which is memorized in advance and a network disconnecting section for disconnecting a network with the mobile terminal when the position information indicates the non-communication area.

Furthermore, in a wireless communication system having mobile terminals and base stations so as to perform wireless communication, the mobile terminal may comprise a position information receiving section for receiving a present position information and a transmitting section for transmitting the present position information to the base station and a network disconnecting section for disconnecting a network with the base station when present position information which indicates a non-communication area is received from the base station, and the base station may comprise a determining section for determining whether or not the position information of a mobile terminal which is received from the mobile terminal indicates a non-communication area which is memorized in advance and a notifying section for notifying the mobile terminal that the position information indicates the non-communication area.

For a mobile terminal in the present invention, mobile phone devices according to CDMA (Code Division Multiple Access) method or PDC (Personal Digital Cellular System) method, or PDA (Personal Digital Assistants) method are included. Here, the present invention includes PDA which has a built-in communication section or which is connected to an external communication section, or which performs transmitting process (receiving process, communicating process) by itself as a characteristic feature in the present invention explained below.

Furthermore, a mobile terminal may comprise a present position information acquiring section, a movement path detecting section for monitoring a moving route of the mobile terminal according to the position information, a determining section for determining whether or not the mobile terminal moves on a predetermined route according to the moving route and the predetermined route information, an operation mode switching section for switching to a predetermined operation mode when it is determined that the mobile terminal moves on the predetermined route.

Also, a mobile terminal may further comprise a route information acquiring section for receiving a predetermined route information from an external device.

Also, in a mobile terminal, the predetermined route may be a route information for transportation facilities.

Also, in a mobile terminal, the route information acquiring section may receive a route information about peripheral area of the present position in the predetermined route information.

Also, in a mobile terminal, the position information acquiring section may receive the position information from a Global Positioning System (GPS).

Also, mode switching method may comprise steps of receiving the present position information, monitoring the moving route according to the position information, determining whether or not a mobile terminal is moving on a predetermined route by comparing the moving route to the predetermined route information, and switching to the predetermined operation mode when the mobile terminal is moving on the predetermined route.

As explained above, when a mobile terminal according to the present invention receives the position information, transmits it to the base station, and receives a communication impossible information based on the position information from the base station, the mobile terminal disconnects the network. Therefore, when a mobile phone user stays or enters in an area which is set as a no-communication area, the network is disconnected automatically making it possible to prevent communication in the no-communication area accurately.

Also, a mobile terminal user does not have to perform complicated operation for disconnecting the network. Therefore, it is possible to provide a useful and efficient mobile terminal.

Also, when the mobile terminal is under a standby condition, the mobile terminal does not transmit the position information. Therefore, it is possible to suppress or at least reduce traffic amount in the network.

Also, according to another aspect of the present invention, it is reported to a mobile terminal user before the network disconnection that the network is disconnected because the user enters in a no-communication area. Consequently, the mobile terminal user knows in advance that the network is disconnected. By doing this, the user can decide what to do afterwards. That is, if the mobile terminal user wishes to keep communicating, it is possible to communicate again by changing his or her position from there.

Also, according to another aspect of the present invention, it is determined whether or not the position of the mobile terminal indicates the no-communication area which is predetermined. When the position information indicates no-communication area, a communication impossible information is transmitted to the mobile terminal. By doing this, it is possible to be aware that the mobile terminal stays or enters in a no-communication area. Thus, it is possible to prohibit a communication in the no-communication area reliably.

Also, according to another aspect of the present invention, a mobile terminal and another mobile terminal which is communicating with the mobile terminal are notified before the network is disconnected that the network is disconnected. Therefore, the users of the mobile terminals can be aware of the fact before the network is disconnected. By doing this, the mobile terminal users can decide what to do afterwards.

Also, according to another aspect of the present invention, it is determined whether or not the position of the mobile terminal indicates a no-communication area which is predetermined. When the position information of the mobile terminal indicates the no-communication area, an instruction for disconnecting the communication with the mobile terminal is performed to the base station. Therefore, it is possible to know whether the mobile terminal exists or enters in the no-communication area making it possible to prohibit the communication in the no-communication area reliably.

Furthermore, according to the mobile terminal in the present invention, a moving route and a predetermined route information are compared. When it is determined that the mobile terminal is moving along the predetermined route, an operation mode is switched to a predetermined operation mode which is set for the predetermined route. Therefore, the user of the mobile terminal does not have to change operation mode which is supposed to be necessary every time he or she uses a transportation facility such as a train making it possible to provide a usual mobile terminal.

Also, operation mode is switched by determining whether or not the mobile terminal is moving along the predetermined route. Therefore, it is possible to limit the execution of the function (manually switching the operation mode) in the mobile phone device which is owned by the user who is in a moving transportation facility such as a train. It is also possible to limit the execution of the function in the mobile phone device which exists in a no-regulation area such as a platform of the train station and a periphery of a route for a transportation facility.

Also, there in no need of investing for a new facility which used to be seen in conventional cases. Thus, it is possible to reduce costs therefore.

Also, according to another aspect of the present invention, a predetermined route information is received from an external device making it unnecessary to retain the route information in the terminal. Thus, it is possible to use memory efficiently.

Also, according to another aspect of the present invention, the predetermined route information is a route information for a transportation facility. Therefore, if the mobile phone device is under condition that the mobile phone should not preferably be used, the mobile phone device monitors such a condition so as to enhance consciousness of manners in public. The operation mode in the mobile phone device is switched to an operation mode which corresponds to the surrounding condition. Thus, the user of the terminal does not have to switch the operation mode in the mobile terminal according to the movement. Consequently, there is an advantage such that complicated operation is not necessary.

Also, according to another aspect of the present invention, a route information receiving section receives a route information for a periphery of the present position in the predetermined route information. Therefore, only the minimum route information which is necessary for determining whether or not the mobile phone device is moving along the predetermined route is retained in the terminal. Therefore, large amount of memory capacity is not necessary. By doing this, it is possible to realize a small device and reduction in cost therefore.

The above advantages and features are of representative embodiments only. It should be understood that they are not to be considered limitations on the invention as defined by the claims. Additional features and advantages of the invention will become apparent in the following description and from the claims.

BRIEF DESCRIPTION OF THE DRAWINGS

A full understanding of the invention can be gained from the following description of the preferred embodiments when read in conjunction with the accompanying drawings in which.

DETAILED DESCRIPTION OF THE INVENTION

This invention solves the problems of prior art by prohibiting a mobile phone communication in an area which is predetermined as a no-communication area and to provide a mobile terminal, a base station controlling station, wireless communication method and wireless communication system which can reduce workload in the mobile terminal and the base station which performs such processes.

Figure 1:
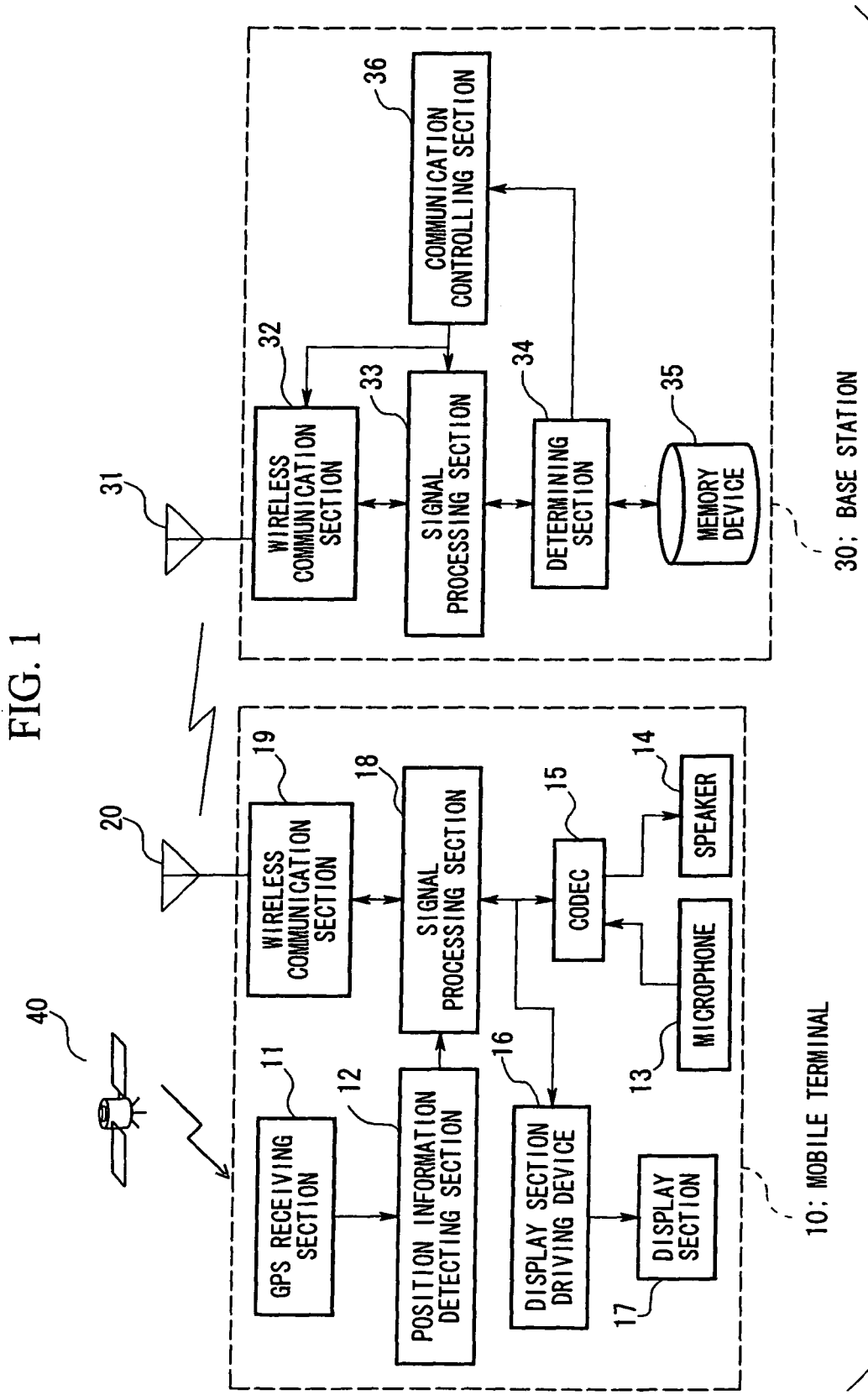
FIG. 1 is a block diagram showing a system including a wireless communication system according to an embodiment of the present invention including a mobile phone and a base station.

In accordance with a first embodiment of the present invention, FIG. 1 is a view showing a wireless communication system.

In this figure, the wireless communication system comprises a mobile terminal 10 and a base station 30 according to an embodiment of the present invention.

In the mobile terminal 10, a GPS (Global Positioning System) receiving section 11 receives a signal from a GPS satellite 40 so as to output the signal to a position information detecting section 12. The positioning information detecting section 12 measures the present position information (longitude, latitude, altitude) of the mobile terminal 10 based on the GPS signal so as to output the position information to a signal processing section 18. A microphone 13 collects external sound and converts the collected sound into an analog signal to the output. A speaker 14 outputs a sound according to the analog voice signal which is output from a CODEC 15.

The CODEC 15 converts the analog signal which is put out from the microphone 13 into a digital signal and sends this digital signal to the signal processing section 18. Also, the CODEC 15 converts the digital signal which is sent from the signal processing section 18 into an analog voice signal which is put out to the speaker 14.

A display section driving device 16 drives a display section 17 comprising a liquid crystal panel and the like according to an image data which is put out from the signal processing section 18 so as to display images and character on the displaying section 17. Here, in the present embodiment, an image data is defined as a data which can be displayed such as a character data and image data or the like.

The signal processing section 18 produces a transmitting data according to a data which is put out from the position information detecting section 12 and a CODEC 15 and puts out the transmitting data to a wireless communication section 19. Also, the signal processing section 18 puts out the image data of received data by the wireless communication section 19 to the display section driving device 16 and puts out the voice data to the CODEC 15.

The wireless communication section 19 modulates the transmitting data which is put out from the signal processing section 18 so as to transmit the transmitting data to the base station via an antenna 20. Also, the wireless communication section 19 demodulates the data which are received from the base station via the antenna 20, and puts out the demodulated signal to the signal processing section 18.

Next, in a base station 30, a wireless communication section 32 transmits the transmitting data which are put out from the signal processing section 33 via an antenna 31. Also, the wireless communication section 32 demodulates the data which are received from the mobile terminal via the antenna 31 and puts out the data to the signal processing section 33.

Also, a network with the mobile terminal is disconnected according to a network disconnection request which is put out from a communication controlling section 36.

The signal processing section 33 puts out a position information in the received data which are put out from the wireless communication section 32 to a determining section 34.

The determining section 34 determines whether or not the mobile terminal 10 which transmits the position information exists in a no-communication area according to the position information which is put out from the signal processing section 33.

A memory device 35 retains position information of the no-communication area where it is inappropriate for communication such as a hospital, a library, a movie theater, and a route for transportation facility in a service area which is covered by the base station 30.

The communication controlling section 36 determines whether or not the network with the mobile terminal should be disconnected according to a result which is determined by the determining section 34. According to the result, the communication controlling section 36 puts out a network disconnection request so as to instruct the disconnection of the network to the wireless communication section 32.

Here, the above memory device 35 comprises a nonvolatile memory such as a hard disk drive device, an optical magnetic disk device, and flash memory, a volatile memory such as a RAM (Random Access Memory), or a memorizing medium made from the above memories of which contents can be read out and written by a computer. Also, information for the no-communication area which is stored in the memory device 35 can be updated easily by a service provider of the wireless communication service.

Figure 2:
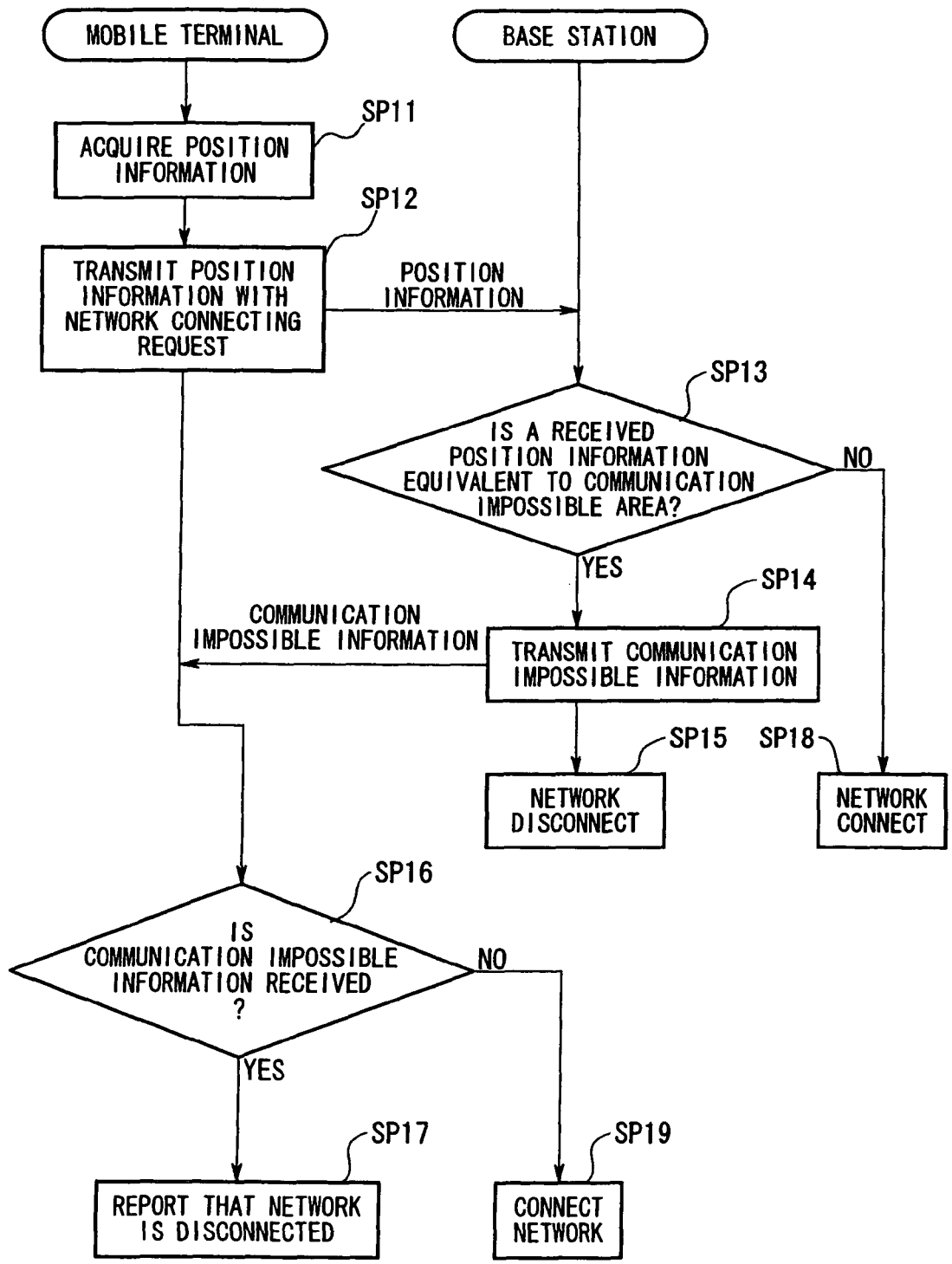
FIG. 2 is a flow chart showing processes which are performed in the mobile terminal and the base station according to an embodiment of the present invention.

Next, operation of the mobile terminal and the base station having the above structure is explained with reference to FIG. 2. Here, processes shown in FIG. 2 are performed on three occasions: when transmission operation is performed, when a phone call is received, and in a predetermined period during a communication.

Hereafter, processes performed in the mobile terminal and the base station when transmission operation is performed are explained.

First, the GPS receiving section 11 in the mobile terminal 10 receives a GPS signal from the GPS satellite 40, and puts out the signal to the position information detecting section 12. The position information detecting section 12 measures the present position information based on the GPS signal and puts out the position information to the signal processing section 18 (step SP11). The signal processing section 18 puts out the position information which is put out from the position information detecting section 12 and the network connection request to the wireless communication section 19. By doing this, the network connection request with the position information of the mobile terminal 10 is transmitted to the base station 30 via the antenna 20 (step SP12).

When the wireless communication section 32 in the base station 30 receives the network connection request with the position information via the antenna 31, the wireless communication section 32 demodulates the received data and puts out the data to the signal processing section 33. The signal processing section 33 extracts the position information from the received data which are put out from the wireless communication section 32 and puts out the position information to the determining section 34.

The determining section 34 determines whether or not the position information which is put out from the signal processing section 33 indicates a no-communication area which is stored in the memory device 35 by matching the received position information to the stored position information which is stored in the memory device 35, and puts out the determined result to the communication controlling section 36 (step SP13).

When the communication controlling section 36 receives the determined result that the mobile terminal 10 which transmits the above position information exists in the no-communication area, the communication controlling section 36 transmits the network to a mobile terminal 10 (a communication impossible signal which indicates that is disconnected) via the signal processing section 33, the wireless communication section 32, and the antenna 31 (step SP14).

Consequently, the communication controlling section 36 in the base station 30 puts out the network disconnection request for disconnecting the network with the mobile terminal 10 to the wireless communication section 32 predetermined period after the communication impossible information is put out to the signal processing section 33 (step SP15). By doing this, the network with the mobile terminal 10 is disconnected.

On the other hand, when the wireless communication section 19 receives the communication impossible information which is transmitted from the base station 30 via the antenna 20 (YES in the step SP16), the mobile terminal 10 demodulates the received information and puts out the demodulated signal to the signal processing section 18. The signal processing section 18 puts out a voice data from the received communication impossible information to the CODEC 15. By doing this, the digital voice signal is converted into an analog voice signal by the CODEC 15. Also, it is reported from the speaker 14 that the network is disconnected because the mobile terminal 10 exists in the no-communication area (step SP17).

Here, if there are image data in the received communication impossible information, the signal processing section 18 puts out the image data to the display section driving device 16. By doing this, it is displayed in the displaying section 17 that the network is disconnected because the mobile terminal 10 exists in the no-communication area. Also, if the communication impossible information contains the image data and the voice data, these data are put out to the CODEC 15 and the displaying section driving device 16. Therefore, report is made by a voice and display.

After that, a process for disconnecting the network is performed in the base station (see step SP15), the network between the mobile terminal and the base station is disconnected.

Here, in the step SP13 in FIG. 2, if it is determined that the mobile terminal 10 does not exist in the no-communication area, the communication controlling section 36 performs a predetermined process such as connecting the network according to the connection request which is received from the mobile terminal 10 (step SP19).

Here, if the process for the communication impossible information which is transmitted in the step SP14 shown in FIG. 2 is performed at the time of transmission, the communication impossible information is transmitted to the mobile terminal which performs the transmission. On the other hand, if the process for the communication impossible information which is transmitted in the step SP14 shown in FIG. 2 is performed at the time of call receiving, the communication impossible information is transmitted to the mobile terminal which receives the phone call and a mobile terminal which transmits the connection request. If the process for the communication impossible information which is transmitted in the step SP14 shown in FIG. 2 is performed during the communication, the communication impossible information is transmitted to both of the mobile terminals which are performing communication.

Also, the communication controlling section 36 in the base station 30 is supposed to put out the network disconnection request to the wireless communication section 32 after it is reported that the communication impossible information is transmitted from the base station 30 to the mobile terminal 10 and the network is disconnected in the mobile terminal 10. That is, a predetermined period between the output of the request for transmitting the communication impossible information from the communication controlling section 36 and the output of the network disconnection request is supposed to be set longer than a period between the output of the transmission request of the communication impossible information from the communication controlling section 36 and the above report in the mobile terminal 10.

Consequently, the mobile terminal 10 can move away from the no-communication area. Here, in order to perform this operation, the mobile terminal 10 needs to receive the present position information periodically and transmit the position information to the base station after receiving the communication impossible information until receiving the network disconnecting request.

As explained above, in the mobile terminal 10 in the present invention, the position information detecting section 12 receives the present position information and transmits the position information to the base station when the transmission operation is performed by the mobile terminal user so as to perform the network connection request according to the transmission to the base station. Also, the position information detecting section 12 measures the present position and transmits the present position information to the base station before the mobile terminal user is notified of the arrival of a phone call. Also, during a communication, the position information is periodically received and transmitted to the base station.

As such, it is determined whether or not the position of the mobile terminal indicates the no-communication area in both mobile terminals one of which requests communication and the other one of which receives the communication. Therefore, the communication between both mobile terminals is promptly disconnected in case one of the mobile terminals enters into the no-communication area.

Also, since the position information is not received in all of the standby condition it is possible to save electricity. Therefore, it is possible to use the electricity in the battery effectively.

Also, since the position information is transmitted only from the mobile terminal which is communicating the base station receives the position information less frequently. Therefore, there are fewer processes in the base station making it possible to reduce the workload necessary for processing operations.

For example, a user of a mobile terminal A designates a mobile terminal B as a terminal to communicate with and transmission operation is performed. First, it is determined whether or not the mobile terminal A exists in the no-communication area. As a result of this, when the mobile terminal A does not exist in the no-communication area, the mobile terminal B receives the transmission request which is transmitted from the mobile terminal A. Here, the present position information is transmitted to the base station by the mobile terminal B before the user of the mobile terminal B is notified of the arrival of the phone call.

Consequently, the base station determines whether or not the mobile terminal B exists in the no-communication area. After it is confirmed that the mobile terminal B does not exist in the no-communication area, the mobile terminal B notifies the user of the mobile terminal B of the arrival of the phone call. As such, when the user of the mobile terminal B responds to the arriving phone call, a communication between the mobile terminal A and the mobile terminal B starts. While the communication goes on, the mobile terminal A and the mobile terminal B receive the position information periodically. The position information and the transmission data are transmitted to the base station. Thus, it is determined whether or not the mobile terminal A and the mobile terminal B exist in the no-communication area by the base station.

As explained above, the network is disconnected if it is confirmed that either mobile terminal enters into the no-communication area when the communication starts or during the communication.

Accordingly, it is possible to always prohibit the communication in an area where telephone communication should preferably be restricted such as a library, a movie theater, or a hospital. Also, even if the user does not operate the telephone so as to disconnect the network, the network is disconnected automatically. Therefore, the user does not have to manually operate the mobile terminal such as a mode-change operation making it possible to provide a useful mobile terminal.

If either mobile terminal enters in the no-communication area during the connection of the network and the network is going to be disconnected, the base station transmits the communication impossible information to the mobile terminal users who are communicating so as to report that the network is disconnected because the users are in the no-communication area.

It is also reported, before the network is disconnected to the user of the mobile terminal that the network is disconnected because the mobile phone terminal user enters in the no-communication area. Therefore, it is possible for the user of the mobile terminal to know, in advance, that the network is disconnected. By doing this, it is possible to prepare for what to do next promptly. That is, if the user of the mobile terminal wishes to continue the communication, it is possible to communicate again by performing a countermeasure such as changing places.

The flow chart in FIG. 2 shows that the base station disconnects the network. It is also acceptable that the mobile terminal disconnects the network. In such a case, a communication controlling section is provided in the mobile terminal. When the communication impossible signal is received from the base station, the user is notified by voice or image that the network is disconnected, and after that, the communication controlling section disconnects the network.

Furthermore, it is possible for the mobile terminal to be provided with functions for a determining section 34 and a memory device 35. In such a case, the mobile terminal periodically receives a position information of the no-communication area and there around where the user of the mobile terminal currently exists. The position information is memorized in the memory device 35, and the position information which is contained in the memory device 35 and the position information of the mobile terminal user are compared. Accordingly, it can be determined whether or not the mobile terminal user exists in the no-communication area.

Also, each section contained in the mobile terminal 10 and the base station 30 can be a hardware for exclusive use of a particular purpose. Also, it is acceptable that such a particular purpose be realized by loading a program to a memory and executing it by a combination of a memory and a CPU (Central Processing Unit).

For an above memory, portable media such as a flexible disk, an optical magnetic disk, ROM, CD-ROM, and a memory device such as a hard disk drive unit which is built in the mobile terminal or a base station, can be used.

Furthermore, the above memory includes a memory which can retain programs for a certain period such as a server which receives a program via a network such as an internet and a communication network such as a telephone network and a volatile memory (RAM) in a computer system which is a client.

Also, it is acceptable that the above program realizes only part of the above functions. Furthermore, the above program for realizing the above functions may be what is called a difference file (difference program) which is realized by a combination of various programs which are stored in the memory contained in the mobile terminal or the base station.

The embodiment of the present invention is explained in detail with reference to the drawings as above. The present invention is not limited to this specific structure and may include designs within a range of the concept of the present invention.

For example, it is acceptable that a determining section 34, a memory device 35, and a communication controlling section 36 shown in FIG. 1 are provided in a base station controlling station for controlling the base station 30 instead of the base station, and the base station controlling station may determine whether or not the network should be disconnected.

This concept is explained as follows with reference to FIGS. 3 and 4.

Figure 3:
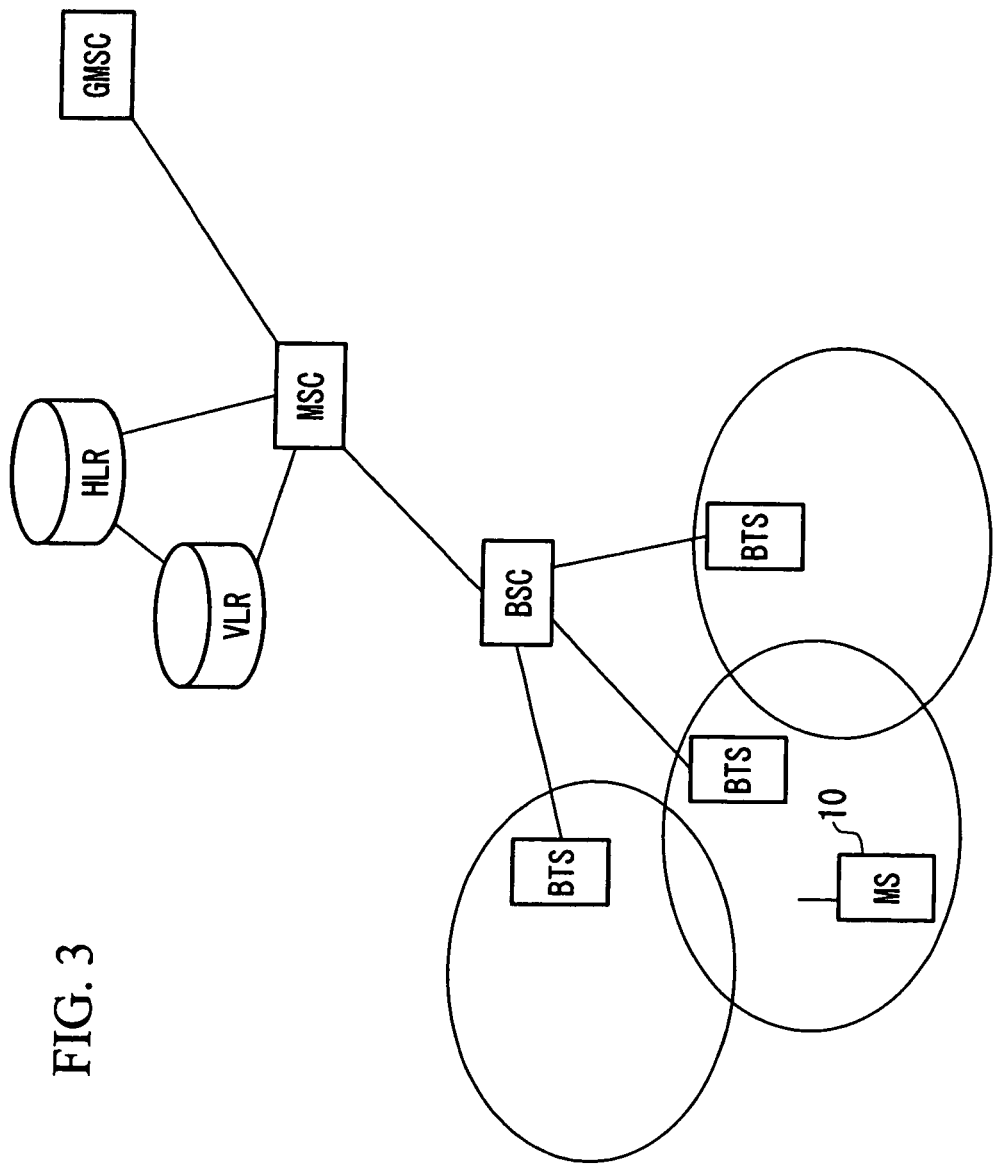
FIG. 3 is a general view for mobile communication network.

FIG. 3 is a general view for a mobile communication network.

In this drawing, a Base Transceiver Station (hereinafter called BTS) is controlled by a Base Station Controller (hereinafter called BSC). Also, the BSC is connected to a Mobile service Switching Center (hereinafter called MSC) which connects a wireless communication network, a public network, and private branch exchange network. Also, the MSC is connected to a Home Location Register (hereinafter called HLR) and a Visitor Location Register (hereinafter called VLR) so as to receive information from these databases. Data for subscribers and certification keys are memorized in the HLR. The data of a subscriber is copied to the VLR when a subscriber visits an area of the VLR and the data of the subscriber is deleted when the subscriber moves to an area for other VLR.

Also, the GMSC performs a process for call-out of an owner of a mobile terminal in another network.

Consequently, sequential process in each device when an MS (Mobile Station; Mobile terminal) 10 performs a transmission operation is explained with reference to FIG. 4. Here, processes for designating a wireless channel to the MS is explained.

Figure 4:
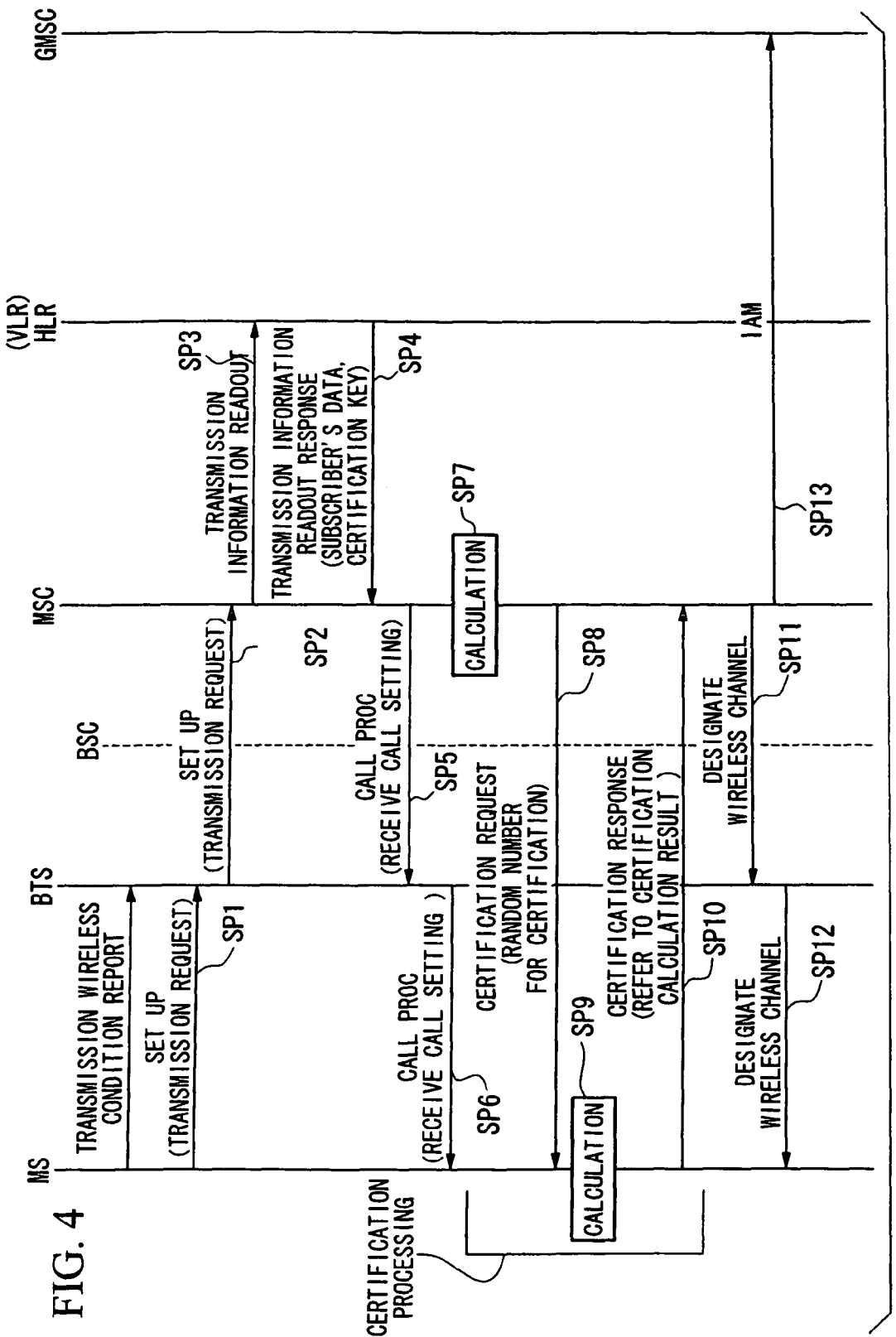
FIG. 4 is a sequence flow in the base station and the base station controlling station in a case which starts from MS.

First, when a user of the MS performs the transmission operation, the transmission wireless communication condition is reported to the BTS, and a call-up setting is requested (including numbers for who transmits and who is called up) by "SET UP" (step SP1 in FIG. 4). The BTS which receives the request sends the "SET UP" to the MSC via the BSC (step SP2). The MSC reads out a transmission information (data for subscriber and certification key) from the HLR or the VLR according to the "SET UP" which is received from the MS via the BTS and BSC (step SP4). Consequently, the MSC sends "CALL PROC (Call Proceeding)" to the MS via the BSC and the BTS so as to report to the MS that the call-up process is performed (step SP5 and SP6).

Consequently, the MSC generates a certification random number in a certification process and performs calculations for a certification by a certification key which is received from the HLR (step SP7). Simultaneously, the MSC notifies the MS via the BSC and the BTS of the certification random number according to the certification request (step SP8).

The MS performs calculations for the certification by using the certification key which the MS currently has and the certification random number which is received from the MSC (step SP9) and notifies the MSC via the BTS and the BSC of the result of the calculation by performing a certification response (step SP10).

The MSC compares the calculation result which is performed by the MSC and the calculation result which is performed by the MS so as to make decision. When the correctness for the MS is certified, a wireless channel is designated to the MS via the BSC and the BTS (step SP11 and SP12). Also, a call-up process for an owner of a mobile terminal in another network is performed via the GMSC (step SP13).

When the BSC or the MSC shown in FIG. 3 is provided with the determining section 34, the memory device 35 and the communication controlling section 36 which are provided in the base station 30 in an embodiment in FIG. 1 of the present invention, the MSC receives the "SET UP" which is received in the step SP2 in FIG. 4 and the present position information of the mobile terminal (MS) which determines whether or not the mobile terminal exists in the no-communication area. If the mobile terminal exists in the no-communication area, the MSC transmits an instruction to the BTS for disconnecting the call-up. Consequently, it is possible to disconnect the network with the mobile terminal promptly without performing processes such as the step SP3 and thereafter.

Also, it is acceptable that the above determining section 34, the memory device 35, and the communication controlling section 36 may be provided in the VLR or the HLR shown in FIG. 3. In such a case, the VLR or the HLR receives the position information of the mobile terminal when the transmission information is read out in the step SP3. In this case, when the received position information indicates that the mobile terminal exists in the no-communication area, an instruction for disconnecting the network is transmitted to the BTS via the MSC and the BSC temporarily.

As explained above, in the present invention, it is minimally required that the communication by a mobile terminal which exists in the no-communication area is prohibited. It is also minimally required that the determining section 34, the memory device 35, and the communication controlling section 36 are provided in either one of the base station or the base station controlling station (BSC, MSC, HLR, or VLR).

Here, in the case in which the base station 30 (BTS in FIG. 3) is provided with the above sections, the MSC receives the present position information of the mobile terminal simultaneously with the "SET UP" in the step SP1 in FIG. 4. Therefore, it is possible to temporally determine whether or not the mobile terminal exists in the no-communication area so as to disconnect the transmission operation by the mobile terminal without proceeding to the step SP2. Also, since the base station 30 is provided with the above sections, the information which is stored in the memory device 35 is limited to information of the no-communication area in a service area which is controlled by the base station 30. Therefore, it is possible to reduce the amount of data which is handled compared to that in the MSC and the BSC.

Figure 5:
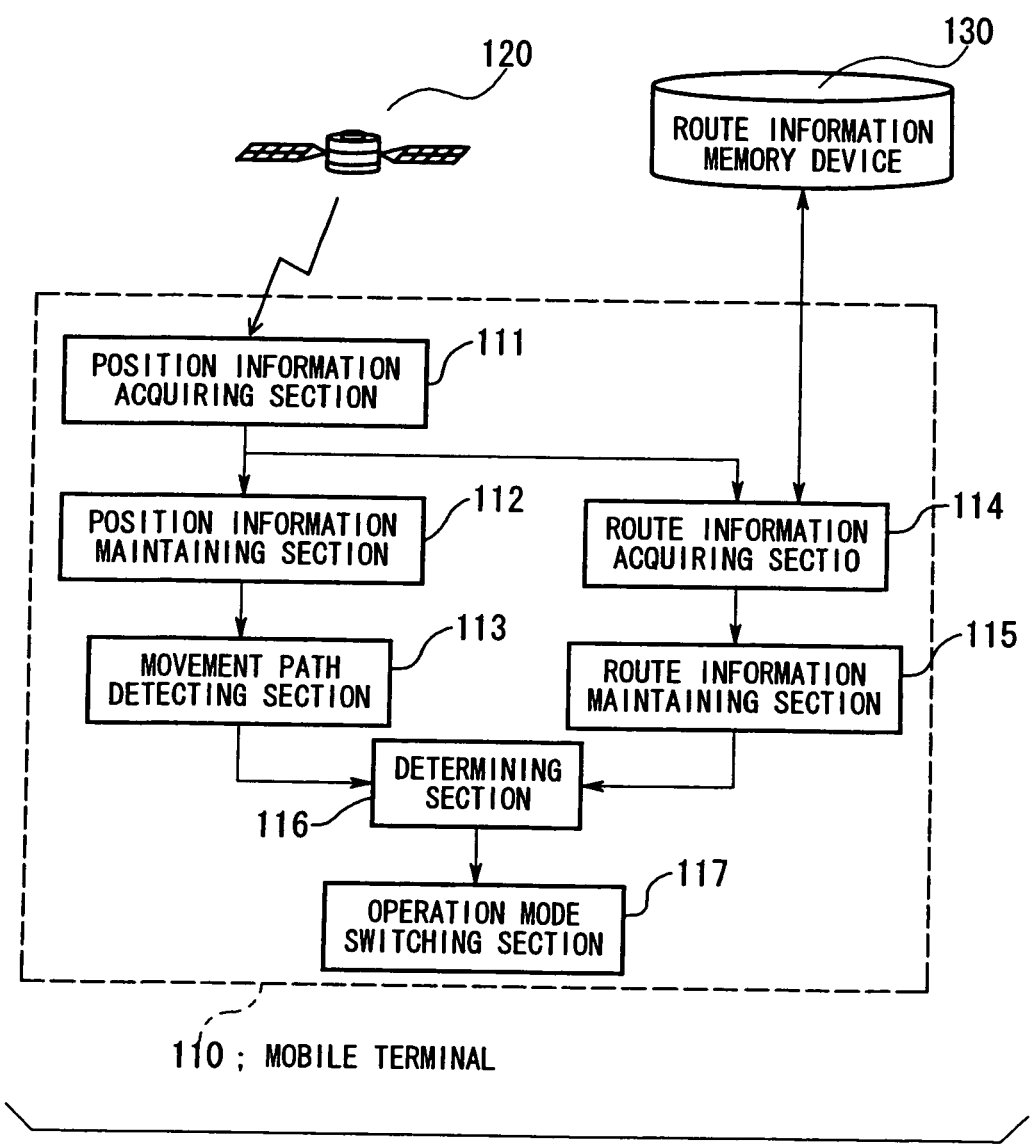
FIG. 5 is a block diagram for functional structure in the mobile terminal according to an embodiment of the present invention.

In accordance with a second embodiment of the present invention, FIG. 5 is a block diagram showing a functional structure of a mobile terminal.

In FIG. 5, a mobile terminal 110 is provided with a position information acquiring section 111 for receiving the present position information, a position information maintaining section 112 for storing the position information which is received in the position information acquiring section 111, a movement path detecting section 113 for monitoring a moving route according to the position information which is stored in the position information maintaining section 112, a route information acquiring section 114 for receiving the local route information according to the present position information received from the route information memory device 130, a route information maintaining section 115 for storing a local route information which is received by the route information maintaining section 114, a determining section 116 for determining whether or not the mobile terminal is moving on the route according to a moving route which is monitored by the movement path detecting section 113 and a local route information which is stored in the route information maintaining section 115, and an operation mode switching section 117 for switching to a predetermined operation mode when it is determined that the mobile terminal is moving on the route by the determining section 116.

Figure 6:
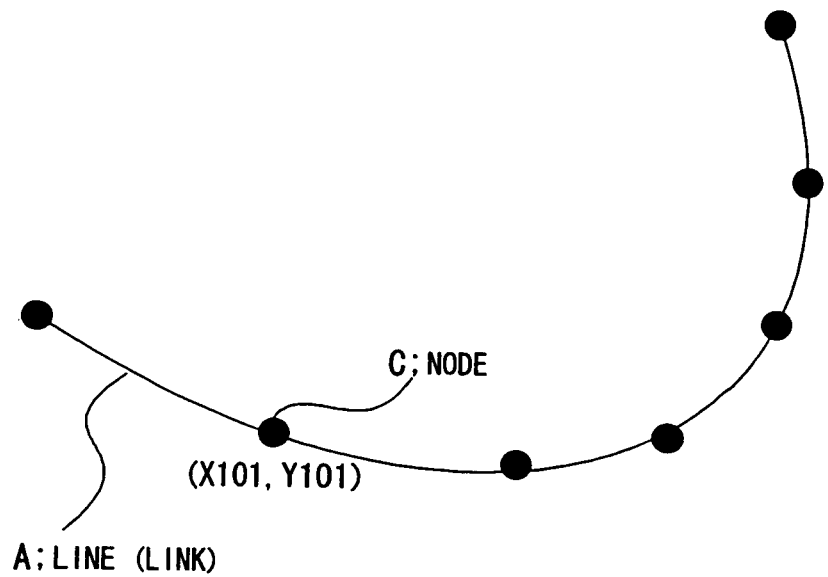
FIG. 6 shows data structure for route information.

The above route information memory device 130 contains route information such as route information of transportation facilities including trains, buses, and airplanes for overall country, for example, overall country of Japan. In the route information, FIG. 6 demonstrates a plurality of node C which are randomly disposed on a route and a plurality of link A which are lines for connecting to the nodes. In each node C, a coordinates information (X101, Y101) for indicating a latitude and a longitude are added. Here, the link A can be separated by an appropriate length, that is a link in a curve is set short and a link in a line is set long.

Next, an operation in the mobile terminal 110 in the second embodiment of the present invention is explained as follows with reference to FIGS. 5 and 7.

First, the position information acquiring section 111 receives the present position information containing a longitude and a latitude from a GPS 120 by a predetermined timing and puts out the received position information to the position information maintaining section 112 and the route information acquiring section 114 (step SP111).

The position information maintaining section 112 stores the information which is put out from the position information acquiring section 111 in a FIFO (First-In-First-Out) format (step SP112). Here, the quantity of position information which is stored in the position information maintaining section 112 can be predetermined randomly.

On the other hand, the route information acquiring section 114 performs updating process for a reference point and updating process for a local route information based on the updated reference point according to the information which is put out from the position information acquiring section 111 (step SP113). This step is explained later.

Consequently, the movement path detecting section 113 monitors a moving route according to the position information which is stored in the position information maintaining section 112 (step SP114).

Figure 8:
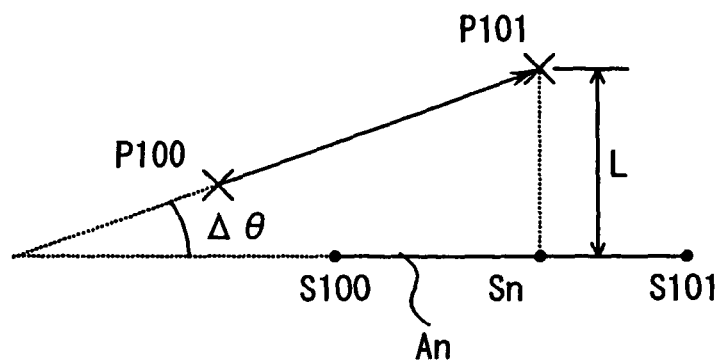
FIG. 8 shows a position relationship between a present position information P101 and a peripheral link An.

More specifically, as shown in FIG. 8, a moving route is monitored according to the present position information P101 which is stored in the position information maintaining section 112 such as a position information which is received by the position information acquiring section 111 in the step SP111 and a previous position information P100 and this information is put out to the determining section 116.

Consequently, the determining section 116 calculates a directional difference $\Delta\theta$ and distance difference L according to the moving route which is monitored by the movement path detecting section 113 and a route information (local route information) which is stored in the route information maintaining section 115 (step SP115).

Specifically, the determining section 116 reads out the closest link to the position information P101 among links which are stored as the local route information such as a link An (hereinafter called a peripheral link) which connects a node S100 and S101 shown in FIG. 8 so as to obtain the directional difference $\Delta\theta$ and distance difference L for a moving route between P100 and P101 for this peripheral link An.

That is, the directional difference $\Delta\theta$ is an acute angle made between a direction of the moving route from P100 to P101 and the peripheral link An. Also, the distance difference L is a minimum distance from the present position P101 to the peripheral link An.

After the directional difference $\Delta\theta$ and distance difference L are determined in this way, a similarity Sn for the latest moving route and a similarity S are determined (step SP116).

Here, the similarity Sn for the peripheral link An can be obtained by the following formula F101.

$$Sn = F \times f + G \times g \quad F101$$

In the above formula, f indicates a directional similarity, g indicates a distance similarity, F indicates a weighting coefficient for the directional similarity, and G indicates a weighting coefficient for the distance similarity.

As explained above, the similarity Sn for the moving route becomes larger if the directional difference $\Delta\theta$ and distance difference L between the route information between P100 and P101 and the peripheral link An are smaller.

Figure 9:
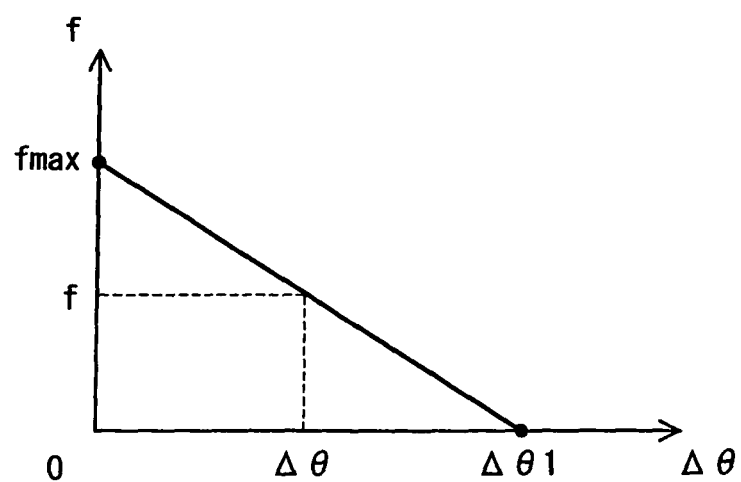
FIG. 9 shows a relationship between a directional similarity (f) and a directional difference ($\Delta\theta$).

Here, the above directional similarity f is determined by obtaining a directional similarity f which corresponds to the directional difference $\Delta\theta$ based on a graph shown in FIG. 9.

Figure 10:
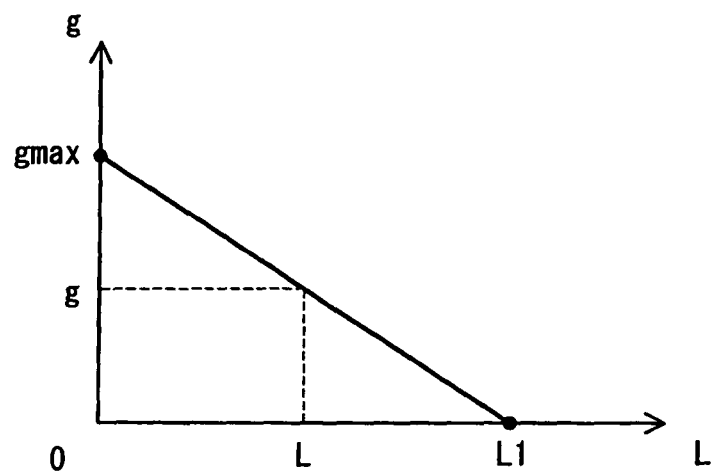
FIG. 10 shows a relationship between a distance similarity (g) and a distance difference (L).

Whereas, the distance similarity g is determined by obtaining a distance similarity g which corresponds to the distance L based on a graph shown in FIG. 10.

Also, the weighting coefficients F and G are determined according to which of the directional difference $\Delta\theta$ or the distance difference L has a priority for calculating the similarity Sn. For example, if both of them have approximately equal priority, these weighting coefficients are set to be equal.

The determining section 116 calculates the similarity Sn for the peripheral link An by the above method and memorizes the similarity Sn in a memory which is not shown in the drawing. By doing this, predetermined quantity of information for the similarity Sn which are calculated so far are accumulated in the memory which is not shown in the drawing in the determining section 116.

Consequently, the determining section 116 calculates the similarity S according to a formula F102 based on the similarity Sn which is calculated temporally and calculated to be memorized in the above memory.

$$S = \Sigma Sn \quad F102$$

Here, as explained above, the position information acquiring section 111 receives the position information by a predetermined timing, for example, every one second. Therefore, the similarity Sn is also calculated in accordance with the above predetermined timing such as every one second. Consequently, under condition that the quantity of the similarity Sn which are memorized in the above memory is five, the similarity S which is calculated in the above formula F102 is obtained as a sum of the similarity Sn during the time for receiving five pieces of position information such as five seconds.

In addition, it is indicated that the moving route of the mobile terminal becomes more similar to the predetermined route if the sum of S for the similarity Sn which is calculated by the above formula F102 in the predetermined time is larger. Also, it is indicated that the moving route of the mobile terminal deviates farther if the similarity is smaller.

According to the above method, the determining section 116 calculates the similarity S. Consequently, the determining section 116 determines whether or not the similarity S is larger than the predetermined threshold St (step SP117).

As a result of this, if the similarity S is larger than the threshold St ("YES" in the step SP117), it is determined that the mobile terminal is moving on the peripheral link An. That is, it is determined that the mobile terminal user is using the transportation facility which goes on a route of the peripheral link An. The signal indicating this is put out to an operation mode switching section 117.

Here, the above threshold St is set to be a similarity under condition that the time in which the distance L between the moving route and the peripheral link is 100 m lasts for five seconds.

When the operation mode switching section 117 receives a signal indicating that the user of the mobile terminal is using the transportation facility from the determining section 116, the operation mode switching section 117 determines whether or not the present operation mode is a predetermined mode so as to be selected when a user of the mobile terminal is using the transportation facility (step SP118).

As a result of this, if the present operation mode is the predetermined mode ("YES" in the step SP118), processing operation finishes without switching operation mode.

On the other hand, if the present operation mode is not the predetermined mode ("NO" in the step SP118), an operation mode is switched (step SP119). That is, the present operation mode is switched to an operation mode to be used when the mobile terminal user is using the transportation facility. The process then finishes.

On the other hand, if the similarity S is lower than the threshold St in the step SP117, it is determined that the mobile terminal is not moving on the peripheral link An. That is, it is determined that the mobile terminal is using none of the transportation facilities. The determining section 116 puts out an signal which indicates this to the operation mode switching section 117.

The operation mode switching section 117 determines whether or not the present operation mode is a normal mode (step SP120) when the operation mode switching section 117 receives a signal which indicates that the mobile terminal user is not using any of the transportation facilities.

As a result, if the present operation mode is a normal mode ("YES" in the step SP120), processing operation finishes without switching operation mode.

On the other hand, if the present operation mode is not the normal mode ("NO" in the step SP120), an operation mode is switched (step SP119) to the normal mode, and the process finishes.

Here, the predetermined mode which is explained above can be any one among an original mode which is predetermined by the user, a manner mode, electricity-off state, or a condition that only the wireless section is turned off (similar to a case in which the mobile terminal user is outside of the communication area). It is possible to use a mode which is predetermined by the user so as to be in the transportation facility.

Here, it is possible to use a mode which is predetermined as an initial setting for taking a situation in a transportation facility into account.

Also, in addition to the above predetermined mode, a normal mode is set such that the mobile terminal is in a normal situation such as inside a house or moving in the street. An operation mode which is predetermined by the user, or an operation mode which is initially set can be used for such a normal mode.

Here, the normal mode and the predetermined mode can be a similar operation mode.

Figure 7:
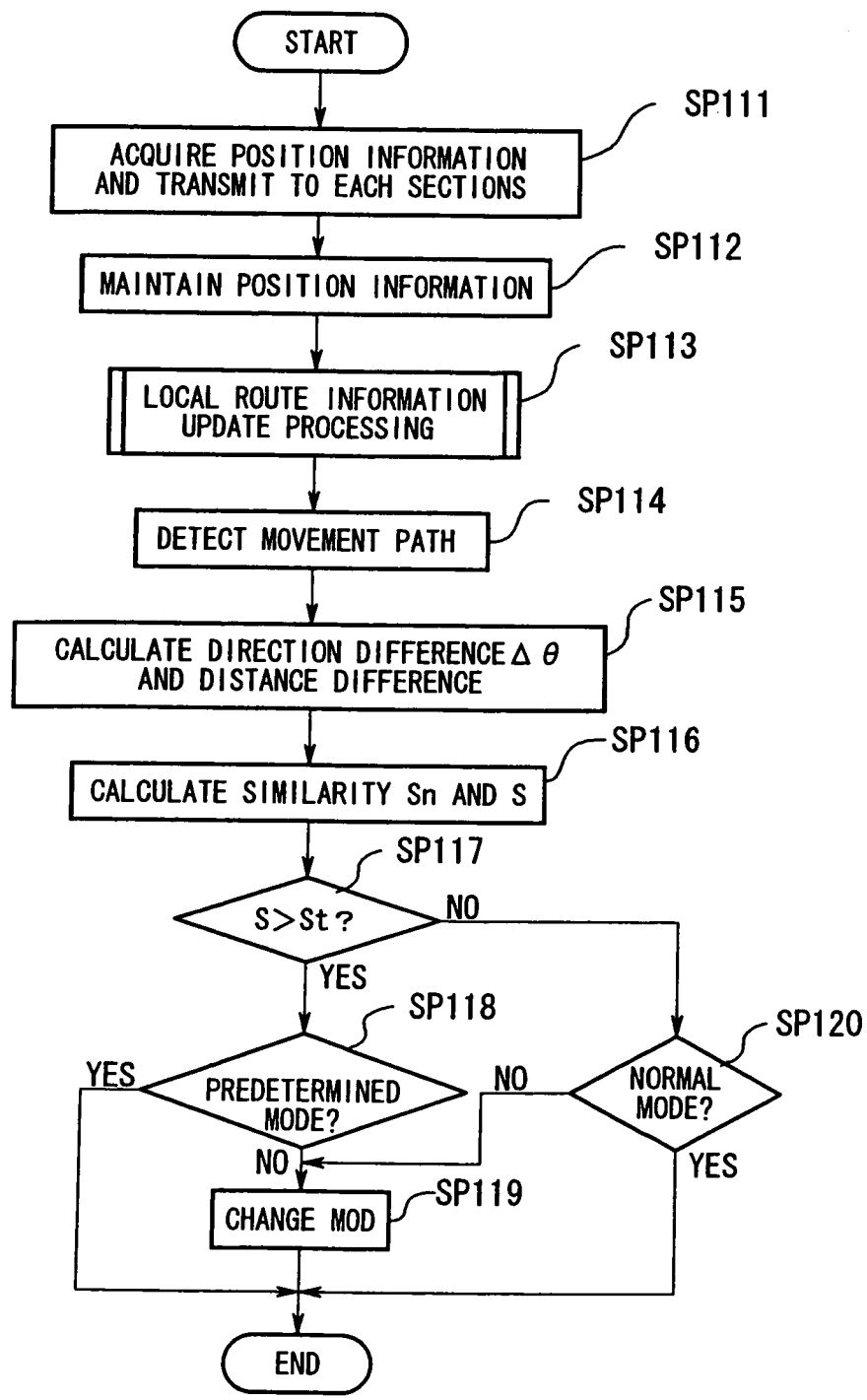
FIG. 7 is a flow chart showing operations in the mobile terminal according to an embodiment of the present invention.
Figure 11:
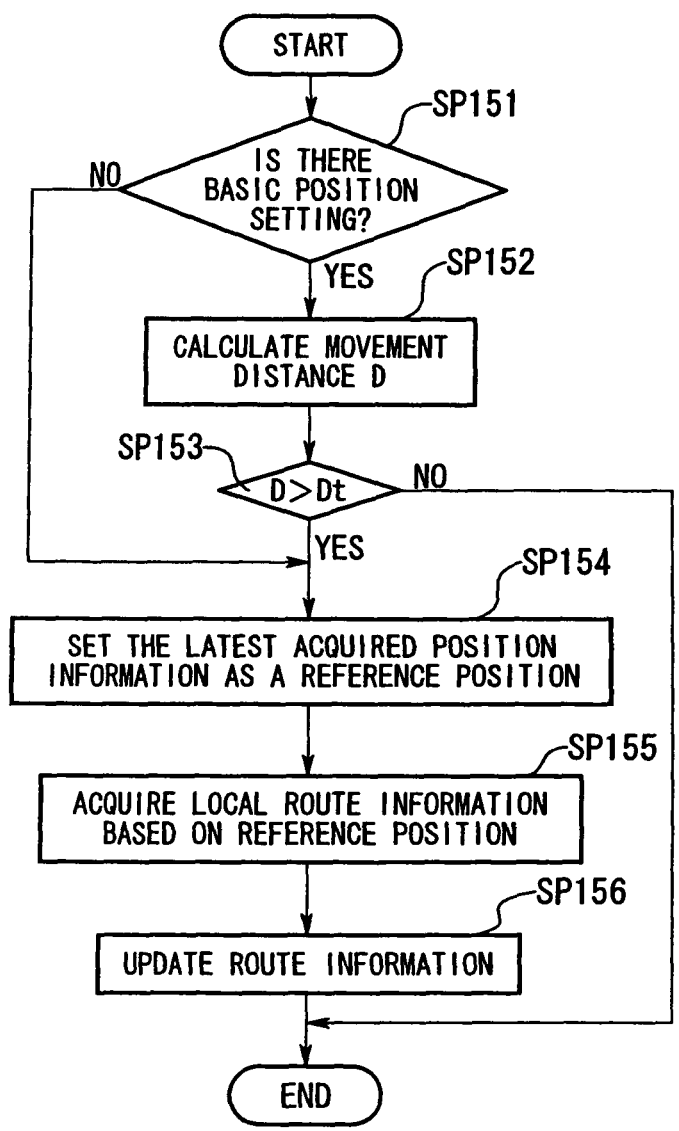
FIG. 11 is a flow chart showing processes performed in the route information receiving device 114 in the mobile terminal in an embodiment of the present invention.

Next, an updating processing operation for a reference point and an updating processing operation for a local route information based on the updated reference point which are performed by the route information acquiring section 114 in the step SP113 shown in FIG. 7 are explained with reference to FIG. 11.

First, when a position information is put out from a position information acquiring section 111, it is determined whether or not a reference position is set (step SP151). As a result of this, if the reference position is not set ("NO" in the step SP154), a position information which is received as an initial position information is set to be a reference position (step SP154).

Consequently, a local route information based on the reference position is received from a route information memory device 130 (step SP155).

Specifically, a route information (local route information) which corresponds to be within a predetermined distance Q around the reference position among the route information stored in the route information memory device 130 for overall country is read out.

Consequently, the local route information is received in the route information acquiring section 114 then stored in the route information maintaining section 115 (step SP156) and the processing operation is finished.

As such, the route information around the reference position is stored in the route information maintaining section 115.

On the other hand, if the reference position is set in the step SP151, a moving distance D is calculated (step SP152) according to a position information which is set as a reference position and as a temporally latest received position information.

Figure 12:
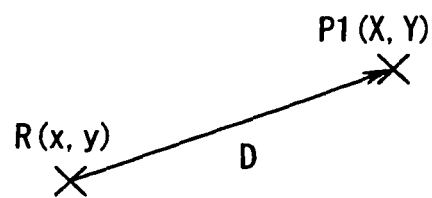
FIG. 12 is a view showing relationship between a reference position (R) and the present position (P1).

Such a calculating formula F103 can be obtained by using the present position information P101 (X, Y) and the reference position (x, y), for example, as shown in FIG. 12.

$$D=\{(X-x)^2+(Y-y)^2\}^{1/2} F103$$

Consequently, it is determined whether or not the calculated distance D is larger than the predetermined distance Dt (step SP153).

As a result of this, if the distance D is larger than the predetermined distance Dt ("YES" in the step SP153), the latest received position information is set to be a new reference position (step SP154). Furthermore, a local route information is received from the route information memory device 130 according to the present reference position (step SP155) and puts out the received local route information to the route information maintaining section 115. Thus, the route information stored in the route information maintaining section 115 is updated (step SP156), and the present processing operation is finished.

By performing the above processing operation, the local route information around the present position information is always stored in the route information maintaining section 115.

Here, the above predetermined distance Dt is set to be smaller than a distance between the deepest region in the local route information and the reference position such as the above explained predetermined distance Q. For example, if the distance Q between the deepest region in the local route information and the reference position is 2 km, the threshold Dt is set to be a distance such as 1.5 km shorter than the distance Dt.

Here, the above route information memory device 130 may be a nonvolatile memory such as a hard disk device, an optical magnetic disk device, a flash memory, a volatile memory such as a RAM (Random Access Memory), or a computer-readable-rewritable-memory-medium made by combining the above devices. Also, contents to be recorded which are already identified may be recorded in a memory medium from which it is possible only to read out the contents such as a CD-ROM. Also, a memory medium which is attachable and detachable such as an IC card may be used.

Also, it is acceptable that a memory medium is disposed as an external device of the mobile terminal so as to perform downloading operation from the external device according to the necessity. In such a case, the contents may by stored in a server which is connected via an internet, an exclusive network, or a public network. Also, it is acceptable for each base station to store the route information (local route information) around each base station. The route information which is stored in the base station in which a new wireless network is established is downloaded when the base station in which currently a wireless network is established, is switched. Thus, the local route information which is stored in the route information maintaining section 115 is updated.

Here, the position information acquiring section 111, the movement path detecting section 113, the route information acquiring section 114, the determining section 116, and the operation mode switching section 117 which are contained in the mobile terminal in the present embodiment of the present invention shown in FIG. 5 may be an independent hardware.

These sections may be a memory or a CPU (Central Processing Unit) in which programs are stored in the memory for realizing each function and the stored program in the memory is downloaded by the CPU so as to execute its function.

Also, the above program may be a program for realizing a part of the above function. Furthermore, the above program may be a difference file (difference program) of which function can be realized by a combination of various programs which are already recorded in the memory contained in the mobile terminal.

Also, a memory in the position information maintaining section 112, the route information maintaining section 115, and the determining section 116, which is not shown in the drawing may be a nonvolatile memory such as a hard disk drive, an optical magnetic disk device, the flash memory or a computer-readable-rewritable-memory-medium which can be realized by combining the above devices.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A mobile terminal comprising:
a position information acquiring section for acquiring position information of said mobile terminal;
a route information maintaining section for storing a route information for a predetermined route information;
a monitoring section for monitoring a mobile terminal route according to said acquired position information;
a determining section for determining whether or not said mobile route corresponds to said predetermined route information; and
an operation mode section for determining a current mode of operation of said mobile terminal and switching said mobile terminal to a predetermined operation mode, which corresponds to said predetermined route, when it is determined that said mobile terminal is moving on said predetermined route and said current mode of operation is not said predetermined operation mode.

2. A mobile terminal according to claim 1 further comprising a route information acquiring section for receiving said predetermined route information from an external device.

3. A mobile terminal according to claim 1 wherein said predetermined route is a route information for transportation facilities.

4. A mobile terminal according to claim 2 wherein said route information acquiring section receives route information about peripheral area of a present position in said predetermined route information.

5. A mobile terminal according to claim 1 wherein said position information acquiring section receives the position information from a Global Positioning System (GPS).

6. Mode switching method comprising the steps of:
detecting position information of a mobile terminal;
monitoring a mobile terminal route according to said position information;
identifying a predetermined route;
determining whether or not said mobile terminal is moving on said predetermined route; and
determining a current mode of operation of said mobile terminal and switching to a predetermined operation mode corresponding to said predetermined route when said mobile terminal is moving on said predetermined route and said current mode of operation is not said predetermined operation mode.

* * * * *